United States Patent Office 2,875,189
Patented Feb. 24, 1959

2,875,189

PREPARATION OF ALKALINE EARTH SALTS OF PHOSPHORUS SULFIDE-HYDROCARBON REACTION PRODUCTS

Albert R. Sabol and Robert E. Karll, Munster, Ind., assignors to Standard Oil Company, Chicago, Ill., a corporation of Indiana No Drawing. Application May 31, 1957
Serial No. 662,607

12 Claims. (Cl. 260—139)

The present invention relates to improvements in the preparation of alkaline earth neutralized reaction products of a phosphorus sulfide and a hydrocarbon; and more particularly, is directed to improvements in neutralizing the reaction products of a phosphorus sulfide and a hydrocarbon with a basic barium compound.

Neutralized reaction products of a phosphorus sulfide and a hydrocarbon, particularly olefin polymers, are extensively used as detergent-type additives in lubricants for internal combustion engines. Such compositions are described, among others, in U. S. Patents Nos. 2,316,080 and 2,316,082, issued April 6, 1943, to C. M. Loane and J. W. Gaynor. The specifications of these patents disclose the neutralization of phosphorus sulfide-hydrocarbon reaction products by treatment with various neutralizing agents, including basic alkaline earth compounds, at about 400° F. While in general the prior art method of neutralization gives satisfactory products, the utilization of the neutralizing agent is relatively poor and the alkaline earth to phosphorus ratio is relatively low. Detergent-type additives should have a high degree of basicity in order to neutralize the acidic compounds formed by the oxidation of the sulfur and other components of the fuel and lubricating oil. It is known that increasing the metal content, and hence the basicity, of such additives will effectively increase the ability of the additive to neutralize the acids formed in the engine. One way of increasing the metal content of such additives is to increase the metal to phosphorus ratio of the additive.

It is an object of the present invention to provide a method of more efficiently neutralizing the reaction products of the phosphorus sulfide and a hydrocarbon with a basic alkaline earth compound. Another object of the invention is to provide an improved method of neutralizing phosphorus sulfide-hydrocarbon reaction products with a basic barium compound to obtain more efficient utilization of the basic reagent. Still another object of the invention is to provide a method of increasing the utilization of barium oxide in the neutralization of reaction products of a phosphorus sulfide and an olefin polymer, and to obtain higher barium to phosphorus ratios. Other objects and advantages of the present invention will become apparent from the following description thereof.

In accordance with the present invention, the foregoing objects can be attained by first oxidizing with hydrogen peroxide the unneutralized reaction product of a phosphorus sulfide and a hydrocarbon, particularly an olefin polymer; and subsequently, neutralizing the oxidized reaction product with a basic alkaline earth compound, more particularly with barium oxide as more fully herein described.

In the preparation of the phosphorus sulfide-hydrocarbon reaction product, the hydrocarbon is reacted with a phosphorus sulfide, such as $P_2S_3$, $P_4S_3$, $P_3S_7$, or other phosphorus sulfides, and perferably phosphorus pentasulfide, $P_2S_5$. The hydrocarbon constituent of this reaction is preferably a mono-olefin hydrocarbon polymer having a molecular weight above about 150, resulting from the polymerization of low molecular weight mono-olefinic hydrocarbons or iso-mono-olefinic hydrocarbons, such as propylenes, butylenes, and amylenes, or the copolymers obtained by the polymerization of hydrocarbon mixtures containing iso-mono-olefins and mono-olefins of 2 to 5 carbon atoms. The polymers may be obtained by the polymerization of these olefins or mixtures of olefins in the presence of a catalyst such as sulfuric acid, phosphoric acid, boron fluoride, aluminum chloride or other similar halide catalysts of the Friedel-Crafts type.

The polymers employed are preferably mono-olefin polymers or mixtures of mono-olefin polymers and iso-mono-olefin polymers having molecular weights ranging from about 150 to about 50,000, or more, and preferably from about 600 to about 10,000. Such polymers can be obtained, for example, by the polymerization in the liquid phase of a hydrocarbon mixture containing mono-olefins and iso-mono-olefins, such as butylene and isobutylene at a temperature of from about −80° F. to about 100° F. in the presence of a metal halide catalyst of the Friedel-Crafts type such as for example, boron fluoride, aluminum chloride, and the like. In the preparation of these polymers, we may employ for example, a hydrocarbon mixture containing isobutylene, butylenes and butanes recovered from petroleum gases, especially those gases produced in the cracking of petroleum oils in the manufacture of gasoline.

A suitable polymer for the reaction with phosphorus sulfide is the product obtained by polymerizing in the liquid phase a hydrocarbon mixture containing butylenes and isobutylenes together with butanes and some $C_3$ and $C_5$ hydrocarbons at a temperature between about 0° F. and 30° F., in the presence of aluminum chloride. A suitable method for carrying out the polymerization is to introduce the aluminum chloride into the reactor and introduce the hydrocarbon mixture cooled to a temperature of about 0° F. into the bottom of the reactor and pass it upwardly through the catalyst layer while regulating the temperature within the reactor so that the polymer product leaving the top of the reactor is at a temperature of about 30° F. After separating the polymer from the catalyst sludge and unreacted hydrocarbons, the polymer is fractionated to obtain a fraction of the desired viscosity, such as for example, from about 80 seconds to about 2000 seconds Saybolt Universal at 210° F.

Another suitable polymer is that obtained by polymerizing in the liquid phase a hydrocarbon mixture comprising substantially $C_3$ hydrocarbons in the presence of an aluminum chloride-complex catalyst. The catalyst is preferably prepared by heating aluminum chloride with isooctane. The hydrocarbon mixture is introduced into the bottom of the reactor and passed upwardly through the catalyst layer, while a temperature of from about 50° F. to about 110° F. is maintained in the reactor. The propane and other saturated gases pass through the catalyst while the propylene is polymerized under these conditions. The propylene polymer can be fractionated to any desired molecular weight, preferably from about 500 to about 1000, or higher.

Other suitable polymers are those obtained by polymerizing a hydrocarbon mixture containing about 10% to about 25% isobutylene at a temperature of from about 0° F. to about 100° F., and preferably 0° F. to about 32° F. in the presence of boron fluoride. After the polymerization of the isobutylene, together with a relatively minor amount of the normal olefins present, the reaction mass is neutralized, washed free of acidic substances and the unreacted hydrocarbons subsequently separated from the polymers by distillation. The polymer mixture so obtained, depending upon the temperature of reaction, varies in consistency from a light liquid to viscous, oily material and contains polymers having molecular weights ranging from about 500 to about 2000, or higher. The polymers so obtained may be used as such, or the polymer may be fractionated under reduced pressure into fractions of the desired molecular weights.

Essentially paraffinic hydrocarbons such as bright stock residuums, lubricating oil distillates, petroleums, or paraffin waxes, may be used. There can also be employed the condensation products of any of the foregoing hydrocarbons, usually through first halogenating the paraffinic hydrocarbons, with aromatic hydrocarbons in the presence of anhydrous inorganic halides, such as aluminum chloride, zinc chloride, boron fluoride, and the like.

Examples of high molecular weight olefinic hydrocarbons which can be employed as reactants are cetene ($C_{16}$), cerotene ($C_{26}$), melene ($C_{30}$), and mixed high molecular weight alkenes obtained by cracking petroleum oils.

Other preferred olefins suitable for the preparation of the hereindescribed phosphorus sulfide reaction products are olefins having at least 20 carbon atoms in the molecule of which from about 13 carbon atoms to about 18 carbon atoms, and preferably at least 15 carbon atoms in a long chain. Such olefins can be obtained by the dehydrogenation of paraffins, such as by the cracking of paraffin waxes or by the dehalogenation of alkyl halides, preferably long chain alkyl halides, particularly halogenated paraffin waxes.

As a starting material there can be used the polymer or synthetic lubricating oil obtained by polymerizing the unsaturated hydrocarbons resulting from the vapor phase cracking of paraffin waxes in the presence of aluminum chloride which is fully described in United States Patents Nos. 1,955,260, 1,970,402 and 2,091,398. Still another type of olefin polymer which may be employed is the polymer resulting from the treatment of vapor phase cracked gasoline and/or gasoline fractions with sulfuric acid or solid adsorbents, such as fuller's earth, whereby unsaturated polymerized hydrocarbons are removed. Also contemplated within the scope of this invention is the treatment with phosphorous sulfide of the polymers resulting from the volatilization of hydrocarbons as described for example in U. S. Patents Nos. 2,197,768 and 2,191,787.

Also contemplated within the scope of the present invention are the reaction products of a phosphorus sulfide with an aromatic hydrocarbon, such as for example, benzene, naphthalene, toluene, xylene, diphenyl and the like or with an alkylated aromatic hydrocarbon, such as for example, benzene having an alkyl substituent having at least four carbon atoms, and preferably at least eight carbon atoms, such as long chain paraffin wax.

In general, the reaction of the phosphorus sulfide and the hydrocarbon, such as the olefin polymer, is carried out in the following manner:

The hydrocarbon, such as for example, an olefinic polymer of the desired molecular weight, is reacted with from about 1% to about 50%, and preferably from about 5% to about 25%, of a phosphorus sulfide, e. g., $P_2S_5$ at a temperature of from about 200° F. to about 600° F. in a non-oxidizing atmosphere, such as for example, an atmosphere of nitrogen. The phosphorus sulfide reaction product can, if desired, be carried out in the presence of a sulfurizing agent as described in U. S. Patent 2,316,087, issued to J. W. Gaynor and C. M. Loane April 6, 1943. The reaction product obtained is then hydrolyzed at a temperature of from about 200° F. to about 500° F., and preferably at a temperature of 300° F. to 400° F. by a suitable means, such as for example, by introducing steam through the reaction mass. The hydrolyzed product containing inorganic phosphorus acids formed during the hydrolysis is preferably contacted with an adsorbent material, such as Attapulgus clay, fuller's earth, and the like, at a temperature of from about 100° F. to about 500° F., as more fully described and claimed in U. S. Patent 2,688,612, issued September 7, 1954, to Roger W. Watson, and the treated hydrolyzed product filtered to obtain a filtrate substantially free of inorganic phosphorus acids.

The unneutralized hydrolyzed phosphorus sulfide-hydrocarbon reaction product as obtained in the above described manner is oxidized prior to neutralization with from about 2% to about 10% of hydrogen peroxide, preferably in about a 30% concentrated solution at a temperature of from about 70° F. to 80° F. for about 2 to 4 hours. The temperature of the reaction mixture is then raised to 212° F.–220° F. to remove water from the reaction mass.

The oxidized hydrolyzed reaction product of the phosphorus sulfide and the hydrocarbon is then neutralized by reaction with a sufficient amount of a basic alkaline earth compound to at least neutralize the acidity of said hydrolyzed oxidized product, at a temperature of from about 70° F. to about 212° F., preferably at a temperature of about 210° F. for a period of about 2 hours to about 6 hours, and preferably about 4 hours. The temperature of the neutralized reaction mixture is then raised to a temperature of about 210° F. to about 350° F., preferably 300° F., and the product then diluted with a suitable diluent oil to facilitate filtration of the product. While any suitable hydrocarbon diluent oil can be used for this purpose, we have found that an SAE–5W oil is particularly well suited. Whereas prior art method of neutralizing hydrolyzed reaction products of a phosphorus sulfide and a hydrocarbon usually gives an alkaline earth to phosphorus ratio of about 2.2:1 to 3.0:1, the improved neutralization method of the present invention will give an alkaline earth to phosphorus ratio of from about 4:1 to about 4.3:1.

The method of the present invention is also adapted to the preparation of alkaline neutralized reaction products of phosphorus sulfide and hydrocarbons. In the preparation of such alkaline products, the unneutralized hydrolyzed reaction products after being oxidized with hydrogen peroxide by the above described method is treated with an excess of the alkaline earth basic reagent and from about 3% to 20% of an alkyl alcohol of 1 to 5 carbon atoms such as methanol, ethanol, and the like; alkaline products so obtained have alkaline earth to phosphorus ratios of from about 6:1 to 7.5:1.

The hydrogen peroxide oxidation can be accomplished by forming the hydrogen peroxide in situ in the reaction mass. This can be effected by carrying out the neutralization of the hydrolyzed phosphorus sulfide-hydrocarbon in the presence of BaO, $BaO_2$ and methyl alcohol. The $BaO_2$ reacts with the water of neutralization, resulting from the treatment of the hydrolyzed reaction product of the phosphorus sulfide and the hydrocarbon with BaO and the methyl alcohol, to form hydrogen peroxide.

The following examples are preferred for carrying out the invention of the preparation of alkaline or neutralized phosphorus sulfide-hydrocarbon reaction products in accordance with the present invention.

*Example I*

The butylene polymer of about 700 molecular weight was reacted with about 15% $P_2S_5$ at a temperature of 400° F. in a nitrogen atmosphere for about 5 hours. The reaction product was then hydrolyzed by steaming at a temperature of about 300° F. and then treated with Attapulgus clay and filtered. The filtrate containing about 2.5% phosphorus was oxidized with 5% of a 30% solution hydrogen peroxide, at a temperature of about 72° F. for 2 to 4 hours, and the temperature raised to 212° F. to remove water from the reaction mixture. The oxidized unneutralized hydrolyzed phosphorus pentasulfide-butylene polymer reaction product was then neutralized with 8½% barium oxide at a temperature of 210° F. for 4 hours, and the temperature of the mixture then raised to 200° F. The product then was diluted with 23% of an SAE–5W mineral oil and filtered. The neutralized $P_2S_5$-butylene polymer reaction product so obtained had a barium to phosphorus ratio of 4.27:1. The barium oxide utilization amounted to better than 97%.

*Example II*

An alkaline barium oxide neutralized $P_2S_5$-butylene polymer reaction product was prepared by diluting the unneutralized hydrolyzed $P_2S_5$-butylene polymer reaction product, obtained as in Example I, with 50% of an SAE–5W mineral oil and oxidizing the diluted product with 5% of a 30% solution hydrogen peroxide at a temperature of about 72° F. for 2 hours and then raising the temperature to 220° F. to remove water from the reaction mass. The oxidized product was then treated with 5% methyl alcohol and sufficient barium oxide to give an 8:1 barium to phosphorus ratio. The neutralized product was then filtered. The filtrate contained 9.35% barium and 1.3% phosphorus, the barium oxide utilization was 90%+, and the barium to phosphorus ratio was 7.2:1.

*Example III*

An unneutralized hydrolyzed $P_2S_5$-butylene polymer reaction product, obtained as in Example I, was diluted with 50% of an SAE–5W mineral oil and reacted with 2.4% methyl alcohol, 4.3% BaO and 3.2% $BaO_2$ at about 70–72° F. for about 4 hours. The temperature of the reaction mass was then gradually increased to 300° F. and the product then filtered. The filtrate contained 6.05% barium and 1.17% phosphorus. The barium oxide utilization was 90%+ and the Ba to P ratio was 5.2:1.

The products prepared by the herein-described methods exhibit advantages not present in the prior art products and methods. Products having increased alkaline earth metal to phosphorus ratios made by other methods, become viscous or even gelled, making it very difficult to filter. Because it is necessary to filter solid material from the additive composition, such viscosity increase and/or gelation is very undesirable. The additives made in accordance with the present invention show no tendency to gel and filter very readily. Furthermore, lesser amounts of the additives of higher metal to phosphorus ratio are required to pass certain engine tests than are required by the prior art additives of lower metal to phosphorus ratios. For example, in the L–1 engine test (described on page 73 of "Motor Oils and Engine Lubrication," by C. W. Georgi; 1950), from about 4.5% to about 6% of a barium-containing neutralized reaction product of $P_2S_5$ and a polybutene of about 750 molecular weight are required to pass the test when the barium to phosphorus ratio is from 5.7:1 to 2.8:1 respectively, whereas only about 3.5% of a barium-containing neutralized reaction product of $P_2S_5$ and a polybutene of about 750 molecular weight is required to pass the L–1 engine test when the barium to phosphorus ratio is 7+:1.

Unless otherwise stated, percentages given herein and in the appended claims are weight percentages.

We claim:

1. In the method of preparing an oil-soluble detergent-type lubricant additive which comprises reacting a reactant consisting of a hydrocarbon, having a molecular weight of at least about 150, with from about 1% to about 50% of a phosphorus sulfide at a temperature of from about 200° F. to about 600° F., hydrolyzing the resultant reaction product at a temperature of from about 220° F. to about 500° F., and neutralizing the hydrolyzed reaction product with a basic alkaline earth compound, the improvement comprising oxidizing the unneutralized hydrolyzed reaction product with from about 2% to about 10% hydrogen peroxide at a temperature of from about 70° F. to about 80° F. for about 2 to 4 hours, raising the temperature to about 212° F. to 220° F. to remove the water of reaction, and neutralizing the resultant oxidized hydrolyzed reaction product with a basic alkaline earth compound.

2. The method of claim 1 in which the hydrocarbon is a polymer of a mono-olefin of 2 to 5 carbon atoms.

3. The method of claim 1 in which the hydrocarbon is a polybutene.

4. The method of claim 1 in which the basic alkaline earth compound is BaO.

5. The method of claim 1 in which the hydrogen peroxide is formed in situ by reacting the unneutralized hydrolyzed reaction product with $BaO_2$ and BaO in the presence of methanol.

6. In the method of preparing an oil-soluble detergent-type lubricant additive comprising reacting a reactant consisting of a hydrocarbon, having a molecular weight of at least about 150, with from about 1% to about 50% of a phosphorus sulfide at a temperature of from about 200° F. to about 600° F., hydrolyzing the resultant reaction product at a temperature of from about 220° F. to about 500° F., clay-contacting the hydrolyzed product and neutralizing the clay-contacted hydrolyzed reaction product with a basic alkaline earth compound, the improvement comprising oxidizing the unneutralized hydrolyzed reaction product with from about 2% to about 10% hydrogen peroxide at a temperature of from about 70° F. to about 80° F. for about 2 to 4 hours, raising the temperature to about 212° F. to 220° F. to remove the water of reaction, and neutralizing the resultant oxidized hydrolyzed reaction product with a basic alkaline earth compound.

7. The method of claim 6 in which the hydrocarbon is a polymer of a mono-olefin of 2 to 5 carbon atoms.

8. The method of claim 6 in which the hydrocarbon is a polybutene.

9. The method of claim 6 in which the basic alkaline earth compound is BaO.

10. In the method of preparing an oil-soluble detergent-type lubricant additive comprising reacting a reactant consisting of a hydrocarbon, having a molecular weight of at least about 150, with from about 1% to about 50% of a phosphorus sulfide at a temperature of from about 200° F. to about 600° F., hydrolyzing the resultant reaction product at a temperature of from about 220° F. to about 500° F., clay-contacting the hydrolyzed product and neutralizing the clay-contacted hydrolyzed reaction product with a basic alkaline earth compound, the improvement comprising oxidizing the unneutralized hydrolyzed reaction product with from about 2% to about 10% hydrogen peroxide at a temperature of from about 70° F. to about 80° F. for about 2 to 4 hours, raising the temperature to about 212° F. to 220° F. to remove the water of reaction, and neutralizing the resultant oxidized hydrolyzed reaction product with an excess of a basic alkaline earth compound in the presence of from about 3% to about 20% of an alkyl alcohol of 1 to 4 carbon atoms.

11. The method of claim 10 in which the hydrocarbon is a polybutene of about 600 to about 10,000 molecular weight.

12. The method of claim 10 in which the basic alkaline earth compound is BaO and the alcohol is methanol.

References Cited in the file of this patent

UNITED STATES PATENTS

| | | |
|---|---|---|
| 2,637,722 | Frazier | May 5, 1953 |
| 2,647,889 | Watson et al. | Aug. 4, 1953 |
| 2,758,089 | Hoff et al. | Aug. 7, 1956 |

UNITED STATES PATENT OFFICE
CERTIFICATE OF CORRECTION

Patent No. 2,875,189                                                         February 24, 1959

Albert R. Sabol et al.

It is hereby certified that error appears in the printed specification of the above numbered patent requiring correction and that the said Letters Patent should read as corrected below.

Column 3, line 7, for "petroleums" read -- petrolatums --.

Signed and sealed this 23rd day of June 1959.

(SEAL)
Attest:

KARL H. AXLINE                                              ROBERT C. WATSON
Attesting Officer                                          Commissioner of Patents